US012743347B2

(12) United States Patent
Cheng et al.

(10) Patent No.: US 12,743,347 B2
(45) Date of Patent: Sep. 22, 2026

(54) CHECKPOINT MANAGEMENT FOR DATA RECOVERY IN A DISTRIBUTED GRAPH COMPUTING SYSTEM

(71) Applicant: Beijing Volcano Engine Technology Co., Ltd., Beijing (CN)

(72) Inventors: Miaomiao Cheng, Beijing (CN); Jiujian Chen, Beijing (CN); Cheng Zhao, Beijing (CN); Cheng Chen, Singapore (SG); Yongmin Hu, Beijing (CN); Xiaoliang Cong, Beijing (CN); Liang Qin, Beijing (CN); Hexiang Lin, Beijing (CN); Ronghua Li, Beijing (CN); Guoren Wang, Beijing (CN); Shuai Zhang, Beijing (CN); Lei Zhang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 32 days.

(21) Appl. No.: 18/780,306

(22) Filed: Jul. 22, 2024

(65) Prior Publication Data

US 2025/0053484 A1 Feb. 13, 2025

(30) Foreign Application Priority Data

Aug. 11, 2023 (CN) ........................ 202311016455.8

(51) Int. Cl.
*G06F 11/1446* (2026.01)

(52) U.S. Cl.
CPC ...... *G06F 11/1469* (2013.01); *G06F 2201/84* (2013.01)

(58) Field of Classification Search
None
See application file for complete search history.

(56) References Cited

U.S. PATENT DOCUMENTS 5,922,078 A * 7/1999 Hirayama ........... G06F 11/1438 714/E11.13
6,957,254 B1 * 10/2005 Iterum ................ H04L 67/1034 709/248

(Continued)

FOREIGN PATENT DOCUMENTS

CN 103914399 A 7/2014
CN 110750385 A 2/2020

(Continued)

OTHER PUBLICATIONS

European Patent Application No. 24188954.2; Extended Search Report; dated Jan. 3, 2025; 10 pages.

(Continued)

*Primary Examiner* — Eddy Cheung
(74) *Attorney, Agent, or Firm* — BakerHostetler

(57) ABSTRACT

Techniques for data recovery are provided. The techniques include receiving a notification message sent by a computing node in a distributed graph computing system, where the notification message represents that the corresponding computing node successfully stores current checkpoint data in a persistent memory; generating a checkpoint identifier corresponding to a current checkpoint when determining that all computing nodes in the distributed graph computing system successfully store the current checkpoint data in respective persistent memories; and sending the checkpoint identifier to each computing node, so that each computing node associates the checkpoint identifier with the current checkpoint data stored in the persistent memory, and the associated current checkpoint data is used for data recovery during recovery execution before the corresponding computing node obtains a checkpoint identifier corresponding to a next checkpoint.

20 Claims, 6 Drawing Sheets

(56) References Cited

U.S. PATENT DOCUMENTS

| | | | | |
|---|---|---|---|---|
| 2004/0158549 | A1* | 8/2004 | Matena | G06F 11/2097 |
| 2015/0006606 | A1 | 1/2015 | Fleury et al. | |
| 2017/0090807 | A1 | 3/2017 | Gupta et al. | |
| 2017/0161151 | A1 | 6/2017 | Jacques Da Silva et al. | |
| 2017/0339203 | A1 | 11/2017 | Kekre et al. | |
| 2018/0373743 | A1* | 12/2018 | Korotkov | G06F 16/2282 |

FOREIGN PATENT DOCUMENTS

| | | | |
|---|---|---|---|
| CN | 115378800 | A | 11/2022 |
| CN | 116048879 | A | 5/2023 |

OTHER PUBLICATIONS

"[C++ Memory Series] 2. C++ dynamic memory allocation and static memory allocation"; https://blog.csdn.net/zl3090/article/details/105329908/; CSDN; Apr. 2020; accessed Jul. 19, 2024; 13 pages (contains English Translation).

https://www.dandelioncloud.cn/article/details/1536326588467888129; Dandelion Cloud; Jun. 2022; accessed Jul. 19, 2024; 47 pages.

China Patent Application No. 202311016455.8; Office Action; dated May 30, 2026; 14 pages.

* cited by examiner

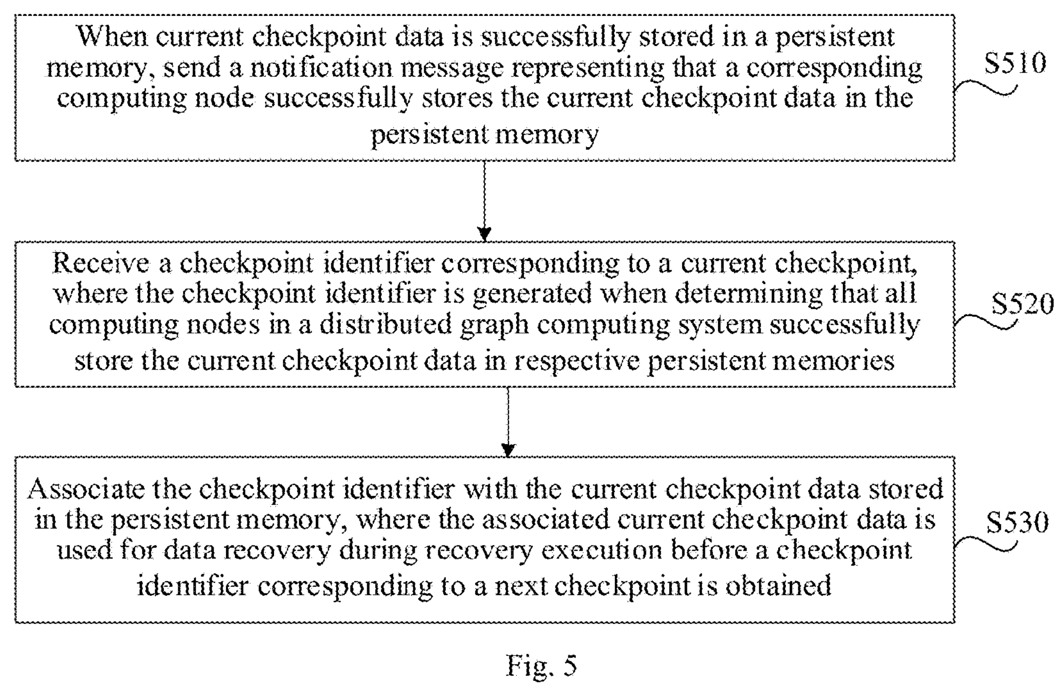

Fig. 5

Master computing node

Slave computing node

S610, When successfully storing current checkpoint data in a persistent memory, a slave computing node sends, to a master computing node, a notification message representing that the corresponding computing node successfully stores the current checkpoint data in the persistent memory S620, When determining that all computing nodes in a distributed graph computing system successfully store the current checkpoint data in respective persistent memories, the master computing node generates a checkpoint identifier corresponding to a current checkpoint S630, The master computing node sends the checkpoint identifier to the slave computing nodes S640, The slave computing node associates the checkpoint identifier with the current checkpoint data stored in the persistent memory

Fig. 6

Data recovery apparatus

800

Third sending module

810

Second receiving module

820

Associating module

830

CHECKPOINT MANAGEMENT FOR DATA RECOVERY IN A DISTRIBUTED GRAPH COMPUTING SYSTEM

CROSS-REFERENCE TO RELATED APPLICATIONS

This application claims the priority of Chinese Patent Application No. 202311016455.8 filed on Aug. 11, 2023, which is incorporated herein by reference in its entirety.

TECHNICAL FIELD

The present disclosure relates to the field of graph computing technologies, and specifically, to a data recovery method, a medium, and an electronic device.

BACKGROUND

A graph is an important data structure, and is formed by nodes and edges. In the graph, a node represents an entity, and an edge represents a relationship between entities. With the rapid increase of the Internet, scales of some graph data become quite large, and this brings huge challenges to graph analysis and computing.

In the related technology, a distributed graph computing system is provided, and a checkpoint (CP) is used in the distributed graph computing system, to deal with processing of large-scale graph data. However, in the related technology, management of checkpoint data in each computing node is insufficient, and iteration consistency of the checkpoint data in distributed computing nodes cannot be ensured, resulting in an error in a graph computing result recovered by using a checkpoint.

SUMMARY

The part of summary is provided to describe concepts in a brief manner, and these concepts will be described in detail in the following part of detailed description. The part of summary neither is intended to identify key features or essential features of the claimed technical solutions, nor is intended to limit the scope of the claimed technical solutions.

The present disclosure provides a data recovery method, including:

- receiving a notification message sent by a computing node in a distributed graph computing system, wherein the notification message represents that the corresponding computing node successfully stores current checkpoint data in a persistent memory;
- generating a checkpoint identifier corresponding to a current checkpoint when determining that all computing nodes in the distributed graph computing system successfully store the current checkpoint data in respective persistent memories; and
- sending the checkpoint identifier to each computing node, so that the each computing node associates the checkpoint identifier with the current checkpoint data stored in the persistent memory, and associated current checkpoint data is used for data recovery during recovery execution before the corresponding computing node obtains a checkpoint identifier corresponding to a next checkpoint.

The present disclosure provides a data recovery method, including:

- when current checkpoint data is successfully stored in a persistent memory, sending a notification message representing that a corresponding computing node successfully stores the current checkpoint data in the persistent memory;
- receiving a checkpoint identifier corresponding to a current checkpoint, wherein the checkpoint identifier is generated when determining that all computing nodes in a distributed graph computing system successfully store the current checkpoint data in respective persistent memories; and
- associating the checkpoint identifier with the current checkpoint data stored in the persistent memory, wherein associated current checkpoint data is used for data recovery during recovery execution before a checkpoint identifier corresponding to a next checkpoint is obtained.

The present disclosure provides a data recovery method, including:

- when successfully storing current checkpoint data in a persistent memory, sending, by a slave computing node to a master computing node, a notification message representing that a corresponding computing node successfully stores the current checkpoint data in the persistent memory;
- when determining that all computing nodes in a distributed graph computing system successfully store the current checkpoint data in respective persistent memories, generating, by the master computing node, a checkpoint identifier corresponding to a current checkpoint;
- sending, by the master computing node, the checkpoint identifier to the slave computing node; and
- associating, by the slave computing node, the checkpoint identifier with the current checkpoint data stored in the persistent memory, wherein associated current checkpoint data is used for data recovery during recovery execution before a corresponding slave computing node obtains a checkpoint identifier corresponding to a next checkpoint.

The present disclosure provides a data recovery apparatus, including a first receiving module, a generating module and a first sending module,

- the first receiving module is configured to receive a notification message sent by a computing node in a distributed graph computing system, wherein the notification message represents that the corresponding computing node successfully stores current checkpoint data in a persistent memory;
- the generating module is configured to generate a checkpoint identifier corresponding to a current checkpoint when determining that all computing nodes in the distributed graph computing system successfully store the current checkpoint data in respective persistent memories; and
- the first sending module is configured to send the checkpoint identifier to each computing node, so that the each computing node associates the checkpoint identifier with the current checkpoint data stored in the persistent memory, and associated current checkpoint data is used for data recovery during recovery execution before the corresponding computing node obtains a checkpoint identifier corresponding to a next checkpoint.

The present disclosure provides a data recovery apparatus, including a third sending module, a second receiving module and an associating module, the third sending module is configured to: when current checkpoint data is successfully stored in a persistent memory, send a notification message representing that a corresponding computing node successfully stores the current checkpoint data in the persistent memory;

the second receiving module is configured to receive a checkpoint identifier corresponding to a current checkpoint, wherein the checkpoint identifier is generated when determining that all computing nodes in a distributed graph computing system successfully store the current checkpoint data in respective persistent memories; and the associating module is configured to associate the checkpoint identifier with the current checkpoint data stored in the persistent memory, wherein associated current checkpoint data is used for data recovery during recovery execution before a checkpoint identifier corresponding to a next checkpoint is obtained.

The present disclosure provides a computer-readable medium, storing a computer program, wherein when the program is executed by a processing apparatus, any of the methods described above is implemented.

The present disclosure provides an electronic device, including a storage apparatus and a processing apparatus, the storage apparatus stores a computer program; and the processing apparatus is configured to execute the computer program in the storage apparatus, to implement any of the methods described above.

According to the above technical scheme, the notification message that is sent by a computing node in the distributed graph computing system and that is used to represent that the corresponding computing node successfully stores the current checkpoint data in the persistent memory may be received, whether all the computing nodes in the distributed graph computing system successfully store the current checkpoint data in the respective persistent memories may be further determined based on the notification message, the checkpoint identifier corresponding to the current checkpoint may be generated when determining that all the computing nodes in the distributed graph computing system successfully store the current checkpoint data in the respective persistent memories, then, the checkpoint identifier is sent to each computing node, so that each computing node can associate the checkpoint identifier with the current checkpoint data stored in the persistent memory, so as to enable the computing node to use the associated current checkpoint data for data recovery during recovery execution before an identifier of a next checkpoint is obtained. The checkpoint identifier corresponding to the current checkpoint is generated only when determining that all the computing nodes in the distributed graph computing system successfully store the current checkpoint data in the respective persistent memories, so that the computing node can further associate the checkpoint identifier with the current checkpoint data stored in the persistent memory, and can use the current checkpoint data for data recovery before the checkpoint identifier corresponding to the next checkpoint is obtained. In this way, during subsequent recovery execution before the checkpoint identifier corresponding to the next checkpoint is obtained, it can be ensured that any computing node can use the current checkpoint data for recovery, to ensure iteration consistency of the checkpoint data, thereby ensuring accuracy of a graph computing result recovered by using a checkpoint.

Other features and advantages of the present disclosure will be described in detail in the detailed description section that follows.

BRIEF DESCRIPTION OF DRAWINGS

The foregoing and other features, advantages and aspects of embodiments of the present disclosure will become more apparent in combination with the accompanying drawings and with reference to the following specific embodiments. Throughout the accompanying drawings, the same or similar reference numerals represent the same or similar elements. It should be understood that the accompanying drawings are schematic and that the originals and elements are not necessarily drawn to scale. In the accompanying drawings:

FIG. 5 is a flowchart of a data recovery method according to an example embodiment of the present disclosure;

FIG. 6 is a flowchart of a data recovery method according to an example embodiment of the present disclosure;

DETAILED DESCRIPTION

Figure 1:
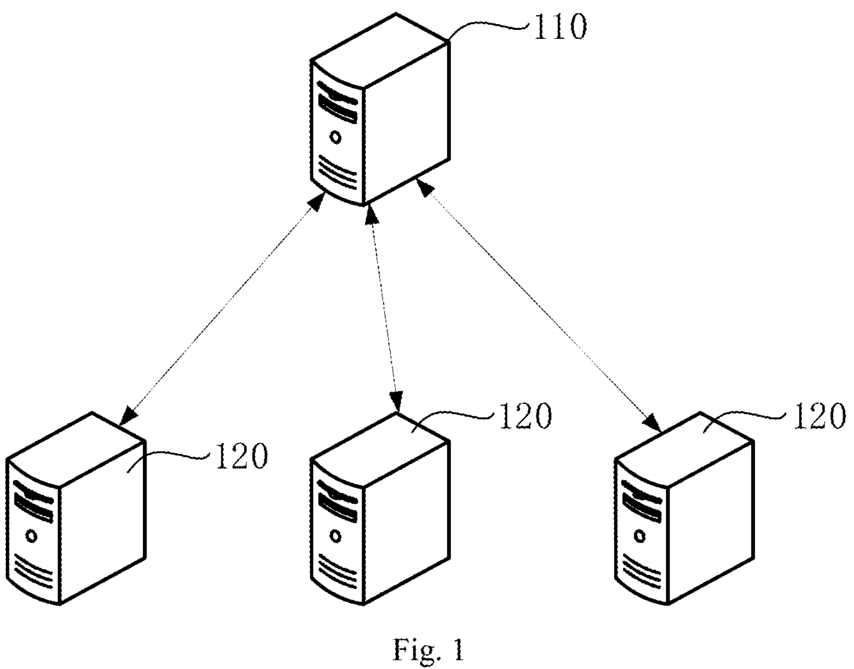
FIG. 1 is an architectural diagram of a distributed graph computing system according to an example embodiment of the present disclosure.

The following will describe, in a more detail manner, embodiments of the present disclosure with reference to the accompanying drawings. Although some embodiments of the present disclosure are shown in the accompanying drawings, it should be understood, however, that the present disclosure may be implemented in various forms and should not be construed as being limited to the embodiments illustrated herein, but rather are provided for a more thorough and complete understanding of the present disclosure. It should be understood that the accompanying drawings and embodiments of the present disclosure are for exemplary purposes only and are not intended to limit the scope of protection of the present disclosure.

It should be understood that the steps recorded in method implementations of the present disclosure may be performed in different sequences, and/or in parallel. In addition, the method implementations may include additional steps and/or omitting performing shown steps. The scope of the present disclosure is not limited in this regard.

The term "including" and its variations are used herein as an open-ended inclusion, that is, "including but not limited to". The term "based on" is "based at least partially on". The term "one embodiment" indicates "at least one embodiment"; the term "another embodiment" indicates "at least one another embodiment"; and the term "some embodiments" indicates "at least some embodiments". Relevant definitions of other terms will be given in the description below.

It should be noted that the concepts such as "first" and "second" mentioned in the present disclosure are only used to distinguish between different apparatuses, modules or units, and are not intended to limit a sequence or interdependence of the functions performed by these apparatuses, modules or units.

It should be noted that the modifications of "one" and "a plurality of" mentioned in the present disclosure are schematic rather than limitative, and a person skilled in the art should understand that the modifications should be understood as "one or more" unless the context clearly indicates otherwise.

Names of messages or information exchanged between a plurality of apparatuses in implementations of the present disclosure are used for illustrative purposes only and are not intended to limit the scope of these messages or information.

It may be understood that before the technical solutions disclosed in embodiments of the present disclosure are used, the user should be informed of the type of personal information involved in the present disclosure, the scope of use, use scenarios, and the like in a proper manner in accordance with the relevant laws and regulations, and authorization of the user should be obtained.

For example, prompt information is sent to a user in response to receiving an active request of the user, to explicitly prompt the user that an operation that the user requests to execute needs to obtain and use personal information of the user. In this way, the user can actively select, based on the prompt information, whether to provide the personal information to software or hardware such as an electronic device, an application, a server, or a storage medium that performs the operation of the technical solution of the present disclosure.

In an optional but non-restrictive implementation, a manner of sending the prompt information to the user in response to receiving the active request of the user may be, for example, a pop-up manner, and the prompt information may be presented in a text manner in a pop-up window. In addition, the pop-up window may further carry a selection control for the user to select "agree" or "disagree" to provide the personal information to the electronic device.

It may be understood that the foregoing notification and user authorization obtaining process is only schematic and does not constitute a limitation on the implementation of present disclosure, and other manners that meet relevant laws and regulations may also be applied in the implementation of the present disclosure.

In addition, it may be understood that data involved in this technical solution (including but not limited to the data itself, and acquisition or use of the data) shall comply with the requirements of the corresponding laws and regulations and relevant provisions.

In some implementations, when a persistent memory is used as a storage medium of each node in a distributed graph computing system, to ensure iteration consistency of checkpoint data in distributed computing nodes, a group of special CPU instructions may be used for control, for example, CPU instructions such as CLFLUSHOPT (used to flash a cache line back to a memory, and invalidate the cache line, where different cache lines may be executed concurrently) or CLWB (used to flash a cache line back to the memory, where different cache lines may be executed concurrently) are used for operations. However, the method is complex in operation and high in costs.

Before technical solutions of embodiments of the present disclosure are described in detail, an application environment in embodiments of the present application is first described.

FIG. 1 is an architectural diagram of a distributed graph computing system. The distributed graph computing system in FIG. 1 includes a plurality of distributed computing nodes. One master computing node 110 may be selected from the computing nodes in the distributed graph computing system in FIG. 1, and the remaining computing nodes are used as slave computing nodes 120. When determining that computing nodes that participate in a graph computing task all store current checkpoint data, the master computing node 110 may generate a unique checkpoint identifier of the system, for example, generate an ID of a current checkpoint. When needing to recover the checkpoint data subsequently, the master computing node 110 may send the checkpoint identifier to a target computing node that performs data recovery. The target computing node may obtain associated checkpoint data from respective persistent memories (PMEM) according to the checkpoint identifier, and perform data recovery based on the associated checkpoint data. The target computing node may be the master computing node 110, or may be the slave computing node 120.

Figure 2:
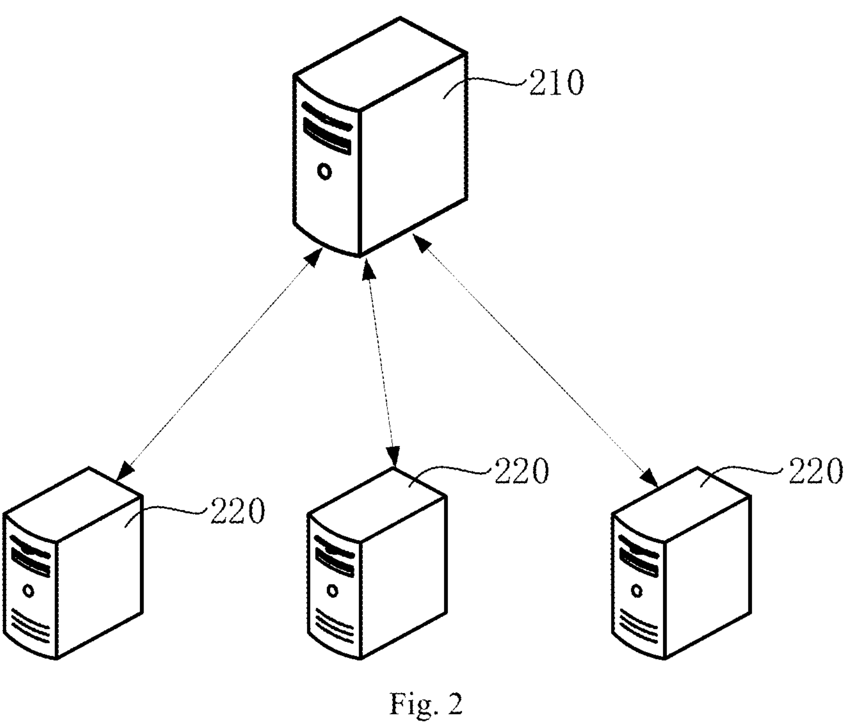
FIG. 2 is an architectural diagram of a distributed graph computing system according to an example embodiment of the present disclosure.

FIG. 2 is an architectural diagram of a distributed graph computing system. The distributed graph computing system in FIG. 2 includes a coordination node and a plurality of distributed computing nodes. When determining that computing nodes that participate in a graph computing task all store current checkpoint data, the coordination node may generate a unique checkpoint identifier of the system, for example, generate an ID of a current checkpoint. When needing to recover the checkpoint data subsequently, the coordination node may send the checkpoint identifier to a target computing node that performs data recovery. The target computing node may obtain associated checkpoint data from respective persistent memories according to the checkpoint identifier, and perform data recovery based on the associated checkpoint data.

In embodiments of the present disclosure, the computing node may be understood as a node device that deploys a graph computing model and actually participates in the graph computing task.

Figure 3:
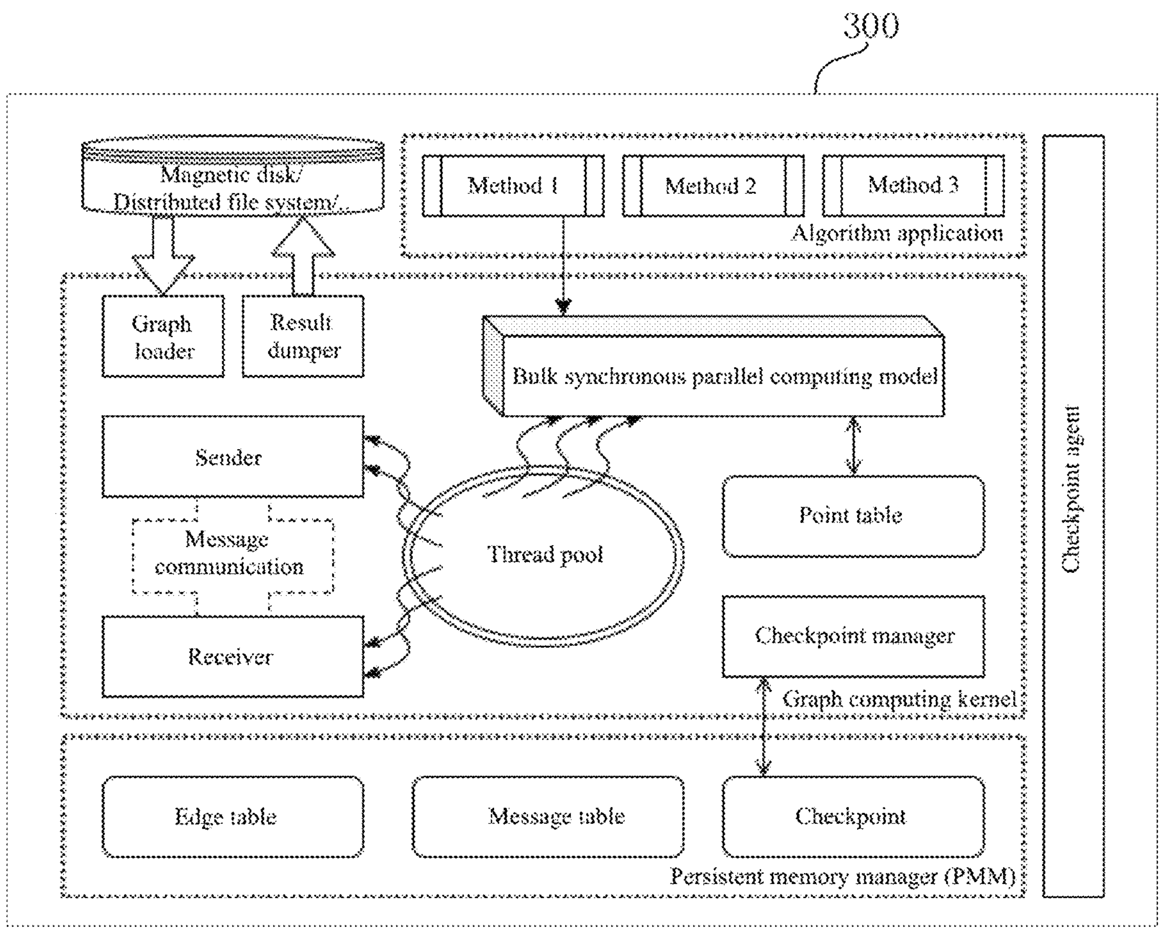
FIG. 3 is an architectural diagram of a graph computing model according to an example embodiment of the present disclosure.

The following then describes, with reference to FIG. 3, the graph computing model deployed in the computing nodes of embodiments of the present disclosure.

As shown in FIG. 3, the graph computing model may include checkpoint agent (CP Agent) module, an algorithm application module, a graph computing kernel module, and a persistent memory manager (PMM) module.

The checkpoint agent module is responsible for managing a global runtime environment in the graph computing model, to ensure that the model can quickly recover when encountering a fault. The checkpoint agent module has capabilities of generating, coordinating, and monitoring running statuses of the computing nodes.

In addition to the model, a user may write a graph algorithm by means of a specified interface, to construct an algorithm application. A method 1 may be, for example, a Compute ( ) method. The method is used as a core computing logic that uses a vertex as a center, and supports various distributed graph algorithms. In addition, the user may further define two optional methods: a method 2 and a method 3. The method 2 may be, for example, a Combine ( ) method, and the method is used to locally combine messages for a same target vertex, so as to reduce cross-node communication overheads. The method 3 may be, for example, an Aggregate ( ) method, the method is responsible for periodically aggregating global intermediate results or statistical data, and is used as a global computing or overall control interface of algorithms. By means of these interfaces, the user can conveniently implement user-defined distributed graph algorithms.

The graph computing kernel is a core part of the graph computing model. When executing an application, the graph computing kernel uses an iteration design of a bulk synchronous parallel computing model (BSP). The graph computing kernel may be further divided into a plurality of components. A sender and a receiver drive a data communication task in computing, including combining messages and constructing a message table in a persistent memory manager. The BSP module represents a set of computing operations. This module manages a process of invoking a computing method, generating a message, and updating a value of a vertex in a plurality of thread in a computing process. Threads used in all processing and communication of computing are all managed by a thread pool. To perform graph algorithm computing, the computing kernel first loads required input graph data from a Hadoop distributed file system (HDFS) or a medium such as a local magnetic disk by using a graph loader. The user may define input data formats of the vertex and the edge. The graph computing model obtains, in a continuous storage manner, performance advantages from sequential read/write. Algorithms are performed according to rounds of supersteps. In each superstep, each computing node processing computing in batches, and shuffles messages to another computing node. After the last superstep is completed, a result dumper writes a result back into the distributed file system or the local magnetic disk in a user-defined manner, and ends the program.

A base module of the system is a persistent memory manager (PMM), which processes access and persistent data management by the system on the persistent memory, including data storage, index construction, memory allocation, and garbage collection.

In consideration of fault tolerance, a checkpoint manager generates and manages checkpoint data that occurs in some supersteps. When entering a fault recovery process, the computing node uses the checkpoint data to recover the computing node itself, to continue distributed computing.

Figure 4:
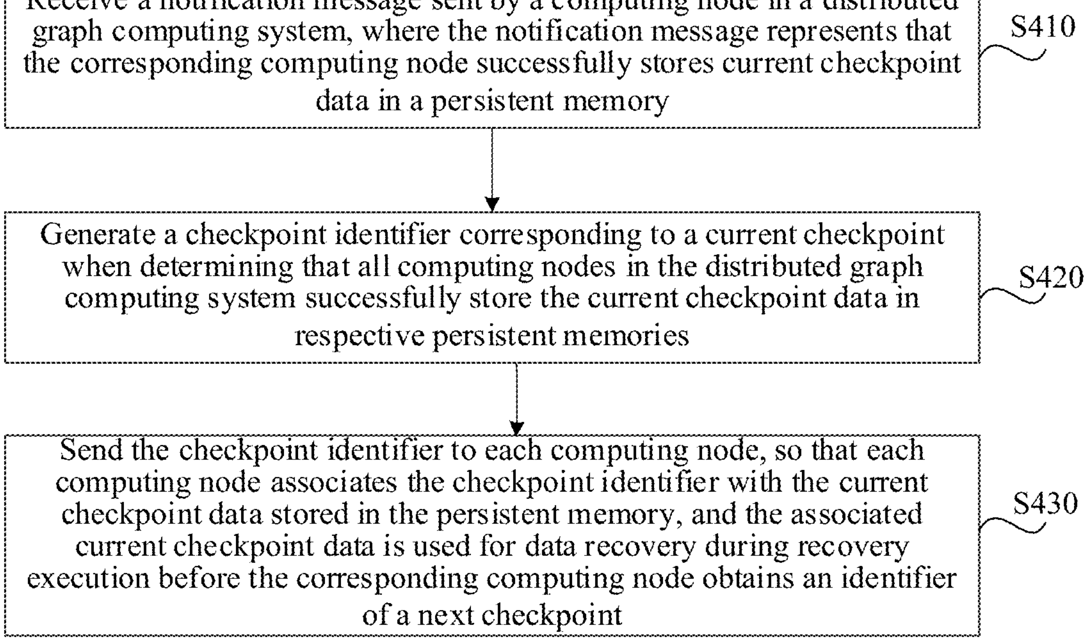
FIG. 4 is a flowchart of a data recovery method according to an example embodiment of the present disclosure.

FIG. 4 is a flowchart of a data recovery method according to an example embodiment of the present disclosure. The data recovery method may be applied to the master computing node shown in FIG. 1 or the coordination node shown in FIG. 2. With reference to FIG. 4, the data recovery method includes the following steps:

S410: Receive a notification message sent by a computing node in a distributed graph computing system, where the notification message represents that the corresponding computing node successfully stores current checkpoint data in a persistent memory.

In a process of performing distributed graph computing on graph data, each computing node that actually participates in a computing task may separately execute a graph computing task of itself.

In some implementations, with reference to FIG. 1, each computing node that actually participates in the computing task may be a master computing node or a slave computing node, so that the master computing node and the slave computing node can separately load required input graph data from a Hadoop distributed file system or a medium such as a local magnetic disk by using a graph loader, and then separately start to execute a superstep computing process, that is, execute the graph computing task. The superstep is one iteration in computing.

In some implementations, with reference to FIG. 2, each computing node that actually participates in the computing task may be any computing node other than the coordination node, and a computing kernel in each computing node can separately load required input graph data from a Hadoop distributed file system or a medium such as a local magnetic disk by using a graph loader, and then separately start to execute the superstep computing process, that is, execute the graph computing task.

It should be noted that, in subsequent embodiments, for ease of understanding, the architectural diagram shown in FIG. 1 is used as an example, to describe detailed technical solutions of embodiments of the present disclosure.

In some implementations, a checkpoint may be constructed according to a preset quantity of supersteps, so that in checkpoint superstep rounds every other preset quantity of supersteps, the master computing node and each slave computing node store, in the persistent memories, data corresponding to a superstep of a current checkpoint. In addition, in this embodiment of the present disclosure, after successfully storing the data corresponding to the superstep of the current checkpoint, any slave computing node can send, to the master computing node, the notification message representing that the corresponding slave computing node successfully stores the current checkpoint data in the persistent memory. In this way, the master computing node can receive the notification message sent by the slave computing node in the distributed graph computing system.

S420: Generate a checkpoint identifier corresponding to a current checkpoint when determining that all computing nodes in the distributed graph computing system successfully store the current checkpoint data in respective persistent memories.

In this embodiment of the present disclosure, because the notification message represents that the corresponding computing node successfully stores the current checkpoint data in the persistent memory, the master computing node may determine, according to the notification message, whether each slave computing node has successfully stored the current checkpoint data in the persistent memory. If notification messages of all slave computing nodes are received, it may be determined that all the slave computing nodes successfully store the current checkpoint data in the persistent memories. In addition, it may be understood that, the master computing node may further determine, in a manner of interprocess communication, whether the master computing node itself has successfully stored the current checkpoint data in the persistent memory.

Therefore, through the foregoing process, the master computing node may determine whether all the computing nodes in the distributed graph computing system successfully store the current checkpoint data in the respective persistent memories. If all the computing nodes in the distributed graph computing system successfully store the current checkpoint data in the respective persistent memories, the master computing node may generate the checkpoint identifier corresponding to the current checkpoint, for example, may generate a count representing the ordinal of the current checkpoint in the entire graph computing process, and the count is used as the checkpoint identifier corresponding to the current checkpoint.

In some implementations, after the checkpoint identifier corresponding to the current checkpoint is generated, the master computing node may store the generated checkpoint identifier in the persistent memory of the master computing node, may further determine that a previous checkpoint identifier is invalid, and may delete the previous checkpoint identifier. This process may be understood as a process of updating the stored checkpoint identifier by the master computing node.

Therefore, in some implementations, the method in this embodiment of the present disclosure may further include the following steps:

updating, by using the checkpoint identifier, a checkpoint identifier stored in the persistent memory.

In this embodiment of the present disclosure, the master computing node may update, by using the checkpoint identifier, the checkpoint identifier stored in the persistent memory.

S430: Send the checkpoint identifier to each computing node, so that each computing node associates the checkpoint identifier with the current checkpoint data stored in the persistent memory, and the associated current checkpoint data is used for data recovery during recovery execution before the corresponding computing node obtains an identifier of a next checkpoint.

In this embodiment of the present disclosure, after generating the checkpoint identifier corresponding to the current checkpoint, the master computing node may send the checkpoint identifier to each slave computing node, to notify each slaving computing node that the previous checkpoint identifier is invalid.

In some implementations, after receiving the checkpoint identifier corresponding to the current checkpoint, the slave computing node may associate the checkpoint identifier corresponding to the current checkpoint with the current checkpoint data stored in the persistent memory, and the associated current checkpoint data may be understood as valid checkpoint data, which may be used for data recovery during recovery execution before an identifier of a next checkpoint is obtained.

In addition, in this embodiment of the present disclosure, the checkpoint identifier corresponding to the current checkpoint is associated with the current checkpoint data, to facilitate subsequent management of the current checkpoint data by using the checkpoint identifier.

In some implementations, if the master computing node does not determine that all the computing nodes in the distributed graph computing system successfully store the current checkpoint data in the respective persistent memories, the master computing node does not generate the checkpoint identifier corresponding to the current checkpoint. In this case, during subsequent data recovery, the computing node performs data recovery by using previous checkpoint data.

In the method in this embodiment of the present disclosure, the notification message that is sent by a computing node in the distributed graph computing system and that is used to represent that the corresponding computing node successfully stores the current checkpoint data in the persistent memory may be received, whether all the computing nodes in the distributed graph computing system successfully store the current checkpoint data in the respective persistent memories may be further determined based on the notification message, the checkpoint identifier corresponding to the current checkpoint may be generated when determining that all the computing nodes in the distributed graph computing system successfully store the current checkpoint data in the respective persistent memories, then, the checkpoint identifier is sent to each computing node, so that each computing node can associate the checkpoint identifier with the current checkpoint data stored in the persistent memory, so as to enable the computing node to use the associated current checkpoint data for data recovery during recovery execution before an identifier of a next checkpoint is obtained. The checkpoint identifier corresponding to the current checkpoint is generated only when determining that all the computing nodes in the distributed graph computing system successfully store the current checkpoint data in the respective persistent memories, so that the computing node can further associate the checkpoint identifier with the current checkpoint data stored in the persistent memory, and can use the current checkpoint data for data recovery before the checkpoint identifier corresponding to the next checkpoint is obtained. In this way, during subsequent recovery execution before the checkpoint identifier corresponding to the next checkpoint is obtained, it can be ensured that any computing node can use the current checkpoint data for recovery, to ensure iteration consistency of the checkpoint data, thereby ensuring accuracy of a graph computing result recovered by using a checkpoint.

In addition, in the method provided in this embodiment of the present disclosure, because CPU instructions such as CLFLUSHOPT and CLWB do not need to be used to implement data iteration consistency of the checkpoint data, implement ion difficulty and implementation costs can be reduced.

In some implementations, the method in this embodiment of the present disclosure may further include the following steps:

updating, by using the checkpoint identifier, a checkpoint identifier stored in the persistent memory; and sending, to a target computing node that performs data recovery, a recovery message for indicating data recovery when determining the current checkpoint data is to be recovered, so that the target computing node obtains, from the respective persistent memories according to the checkpoint identifier included in the recovery message, the associated current checkpoint data, and performs data recovery based on the current checkpoint data.

In this embodiment of the present disclosure, after generating the checkpoint identifier corresponding to the current checkpoint, the master computing node may update, by using the generated checkpoint identifier, the checkpoint identifier stored in the persistent memory. In this way, until the checkpoint identifier corresponding to the next checkpoint is generated, if it is determined, at a moment, that the current checkpoint data needs to be recovered, the recovery message indicating data recovery may be sent to the target computing node that performs data recovery. The recovery message includes the checkpoint identifier. In this way, the target computing node may obtain, from the respective persistent memories according to the checkpoint identifier included in the recovery message, the current checkpoint data associated with the checkpoint identifier, and then may perform data recovery based on the current checkpoint data.

In the method in this embodiment of the present disclosure, data recovery is performed based on the checkpoint identifier uniquely stored in the master computing node, to further ensure iteration consistency of the checkpoint data for data recovery.

It can be learned with reference to the foregoing content that, in this embodiment of the present disclosure, any computing node in the distributed graph computing system supports storing the current checkpoint data into the persistent memory of the computing node. In some implementations, any computing node in the distributed graph computing system stores the current checkpoint data into the persistent memory of the computing node in the following manner:

determining each key in a key value pair storage structure based on a first data type of each piece of data included in the current checkpoint data and a superstep sequence number corresponding to the current checkpoint data; determining values in the key value pair storage structure based on data content respectively corresponding to data of first data types included in the current checkpoint data; and using a key and a value that correspond to a same first data type as a set of key value pair data for storage into the persistent memory of the computing node.

In this embodiment of the present disclosure, data types of data may be divided from different dimensions. For example, the data types may be divided into a first data type and a second different type from different dimensions. The first data type may include types such as a point, an edge, and a message. The second data type may include segmentable data and non-segmentable data.

In this embodiment of the present disclosure, the current checkpoint data may be stored by using the key value pair storage structure. In a computing node, each key is generated based on the first data type of the current checkpoint data and the corresponding superstep sequence number. The superstep sequence number may be understood as an execution round corresponding to a superstep. For example, if the current checkpoint is a checkpoint constructed for data of the fifth superstep, the superstep sequence number corresponding to the current checkpoint data is 5. Each value is generated based on data content respectively corresponding to data of first data types in the checkpoint data.

In some implementations, point data may be stored by using a point table. Edge data may be stored by using an edge table. Message data may be stored by using a message table.

After keys and values are constructed, a key and a value that correspond to a same first data type in a same piece of checkpoint data may be used as a set of key value pair data for storage into the persistent memory of the computing node.

The key value pair data structure is constructed by using the method in this embodiment of the present disclosure, to quickly and accurately position required checkpoint data during data recovery.

In some implementations, key value pairs corresponding to the current checkpoint data may be stored by using a hash table. In this way, during subsequent recovery based on the current checkpoint data, only a key value pair index in the persistent memory needs to be recovered, to be specific, the first data type and the superstep sequence number are recomputed to search for a corresponding key value pair. In this way, overheads for searching for the first data type and the superstep sequence number can be avoided effectively, to improve recovery efficiency.

In some implementations, any computing node in the distributed graph computing system stores the current checkpoint data into the persistent memory of the computing node in the following manner:

when the current checkpoint is a checkpoint constructed before a first superstep, using topology information and an initial vertex state that are included in graph data on which graph computing is to be performed as the current checkpoint data for storage into the persistent memory of the computing node; or when the current checkpoint is a checkpoint constructed for a superstep of any checkpoint after the first superstep, using an incremental vertex state corresponding to the superstep of the checkpoint and message data corresponding to the superstep of the checkpoint as the current checkpoint data for storage into the persistent memory of the computing node, where the incremental vertex state is a vertex state change of a vertex state corresponding to the superstep of the checkpoint relative to the initial vertex state.

In this embodiment of the present disclosure, to perform data recovery at an initial stage of graph computing, a checkpoint may be constructed before the first superstep is performed. In addition, with reference to the foregoing content, it can be learned that, in this embodiment of the present disclosure, the checkpoint may be further constructed according to the preset quantity of supersteps in the process of executing graph computing.

Considering that the topology information does not change in a superstep, to save storage resources, checkpoint storage may be performed once only before the first superstep. Therefore, in this embodiment of the present disclosure, when the current checkpoint is the checkpoint constructed before the first superstep, the topology information and the initial vertex state that are included in the graph data on which graph computing is to be performed may be used as the current checkpoint data for storage into the persistent memory of the computing node. The topology information included in the graph data on which graph computing is to be performed may include edges included in the graph data on which graph computing is to be performed and partition information corresponding to the graph data on which graph computing is to be performed in overall graph data.

Considering that the vertex state and the message data change in each superstep, the vertex state and the message data need to be stored in each superstep of the checkpoint. Therefore, in this embodiment of the present disclosure, when the current checkpoint is the checkpoint constructed for the superstep of any checkpoint after the first superstep, the vertex state corresponding to the superstep of the checkpoint and the message data corresponding to the superstep of the checkpoint may be used as the current checkpoint data for storage into the persistent memory of the computing node.

In some implementations, for the vertex state corresponding to the superstep of the checkpoint, only the vertex state change of the vertex state corresponding to the superstep of the checkpoint relative to the initial vertex state may be stored, that is, only the incremental vertex state is stored. Subsequently, the vertex state corresponding to the superstep of the checkpoint may be accurately recovered based on the obtained incremental vertex state and the initial vertex state. This can also ensure iteration consistency of the checkpoint data in distributed computing nodes. Because a data volume of the incremental vertex state is far less than that of a real vertex state, storage resources can be further saved.

In addition, to fully use bandwidth of the persistent memory, in some implementations, when the vertex state or the incremental vertex state is stored into the persistent memory, the vertex state or the incremental vertex state may be stored into the persistent memory in a multi-thread parallel manner.

In some implementations, a memory of any computing node in the distributed graph computing system includes a first buffer, a second buffer, and a third buffer; when the current checkpoint is a checkpoint constructed for a superstep of any checkpoint after a first superstep, the first buffer is used to store message data corresponding to a superstep between a superstep of the current checkpoint and a superstep of a previous checkpoint, and message data corresponding to the superstep of the current checkpoint is stored in an idle buffer in the second buffer and the third buffer.

In this embodiment of the present disclosure, the first buffer, the second buffer, and the third buffer may be created in the memory of the computing node. Considering that conventional superstep data that is between supersteps of the checkpoint and for which a checkpoint does not need to be constructed does not need to be used for data recovery, the conventional superstep data may be stored by using one buffer, and even if the data is lost, impact caused is not large. Considering that the checkpoint data is used for data recovery, two other buffers are provided for working alternately in the superstep of the checkpoint. In this way, when superstep data of a checkpoint previous to the current checkpoint is not successfully stored into the persistent memory, the current checkpoint data can have a place for buffer, to ensure that a latest checkpoint message is always available.

It can be learned with reference to the foregoing content that, in this embodiment of the present disclosure, any computing node in the distributed graph computing system supports storing the current checkpoint data into the persistent memory of the computing node. In addition, any computing node may further support storing the conventional superstep data into the persistent memory of the computing node, for example, may also store message data temporarily stored in a conventional superstep into the persistent memory. In some implementations, regardless of which type of data, any computing node in the distributed graph computing system stores the data into the persistent memory of the computing node in the following manner:

obtaining a second data type of data to be stored into the persistent memory; determining a target storage mode corresponding to the data based on a correspondence between the second data type and a storage mode; and storing the data based on the target storage mode.

In this embodiment of the present disclosure, the storage model corresponding to the second data type may be selected according to the second data type of the data to be stored into the persistent memory, to store the data.

With reference to the foregoing content, it can be learned that, the second data type may include segmentable data and non-segmentable data, and in this case, the storing the data based on the target storage mode may include the following steps:

segmenting the segmentable data according to memory page sizes in the persistent memory, and storing segmented data respectively into corresponding memory pages; and applying for a memory block corresponding to the size of the non-segmentable data from the persistent memory, and storing the non-segmentable data into the memory block.

In this embodiment of the present disclosure, the segmentable data, for example, point, edge, or message data, may be segmented, that is, data content is not affected after the data is segmented. The non-segmentable data, for example, some serialized data, metadata in a checkpoint, or the like cannot be segmented, that is, data content is affected after the data is segmented, resulting in errors.

In this embodiment of the present disclosure, for data of different second data types, different data storage methods are used.

In some implementations, memories are allocated to the segmentable data in a fixed memory allocation manner. A page is used as a minimum allocation unit of the persistent memory, and the segmentable data is segmented according to memory page sizes in the persistent memory, and segmented data is respectively stored into corresponding memory pages. In this way, the segmentable data may be stored by using a series of pages with a sequence. Optionally, to implement good data access and allocation, a page size may be set to a physical page size of an operating system.

In some implementations, a segmentable data storage page may be obtained by using a shared memory management policy. When a thread attempts to allocate an object, the thread first searches a private object buffer of the thread, to obtain an idle object. If there is no idle object, the thread obtains a released object from a global idle list, to refill a local object buffer of the thread. Only when there are no sufficient idle objects in the global idle list, the thread allocates a new block from the persistent memory, and generate an idle object by using the new block, to refill the object buffer. When the thread wants to delete an object, the thread first sets a label of the deleted object, and then add, to the private object buffer during subsequent recycling, the object carrying the label. If the thread finds, in the object buffer, that there are excessive idle objects (for example, exceeding twice of a batch loading size), the thread moves some idle object from a private free list of the thread to a global free list.

The method in this embodiment of the present disclosure may be used to provide excellent data locality and high-performance data allocation for the segmentable data.

In some implementations, memories are allocated to the non-segmentable data in a dynamic memory allocation manner. The memory block corresponding to the size of the non-segmentable data is applied for from the persistent memory, and the non-segmentable data is stored into the memory block, to adapt to storage of the non-segmentable data of different sizes.

In some implementations, for the non-segmentable data on which memory allocation is performed in the dynamic memory allocation manner, during data arrangement, the data needs to be migrated from an existing block to a newly allocated block, to improve data locality. Optionally, when a highly-fragmented block is found, the block is first scanned to position all valid records of the block, and then these valid records are copied into one new block, to enable data arrangement to be more compact, and next, memory access with a migration record is mapped to a new memory address, and memory space of the old block is finally recycled.

In some implementations, any computing node in the distributed graph computing system manages, in the following manner, the data stored in the persistent memory of the computing node:

managing each piece of data stored in the persistent memory according to a lifecycle corresponding to each piece of data stored in the persistent memory of the computing node.

In this embodiment of the present disclosure, a corresponding lifecycle may be added to each piece of data stored in the persistent memory of the computing node, so as to manage each piece of data stored in the persistent memory according to the lifecycle corresponding to each piece of data in the persistent memory.

In some implementations, the lifecycle may include persistent storage, deletion after reading, and storage with the checkpoint identifier. In this case, the managing each piece of data stored in the persistent memory according to a lifecycle corresponding to each piece of data stored in the persistent memory of the computing node may include the following steps:

in a process of performing distributed graph computing on graph data, storing data whose corresponding lifecycle is persistent storage into the persistent memory of the computing node; in the process of performing distributed graph computing on the graph data, after reading data that is in the persistent memory and whose corresponding lifecycle is deletion after reading, deleting the data whose corresponding lifecycle is deletion after reading; and in the process of performing distributed graph computing on the graph data, after deleting the checkpoint identifier, deleting data that is associated with the deleted checkpoint identifier and whose corresponding lifecycle is storage with the checkpoint identifier.

In this embodiment of the present disclosure, data whose lifecycle is persistent storage, for example, the topology information, should remain valid in the entire running time of distributed graph computing. Therefore, in the process of performing distributed graph computing on graph data, the data whose corresponding lifecycle is persistent storage may be stored into the persistent memory of the computing node.

Data whose lifecycle is deletion after reading, for example, message data temporarily stored in a conventional superstep, is destructed after being read, is not stored in the checkpoint, and is not recovered after the process is restarted. Therefore, in the process of performing distributed graph computing on the graph data, after data that is in the persistent memory and whose corresponding lifecycle is deletion after reading is read, the data whose corresponding lifecycle is deletion after reading may be deleted.

For data whose lifecycle is storage with the checkpoint identifier, for example, the checkpoint data, the checkpoint data is associated with the checkpoint identifier, and is stored together with the checkpoint identifier. Therefore, in the process of performing distributed graph computing on the graph data, after the checkpoint identifier is deleted, data that is associated with the deleted checkpoint identifier and whose corresponding lifecycle is storage with the checkpoint identifier may be deleted.

In the method in this embodiment of the present disclosure, a lifecycle is set for the data stored in the persistent memory, and storage management is performed on the data stored in the persistent memory according to the corresponding lifecycle, so as to improve the efficiency of managing the data stored in the persistent memory.

FIG. 5 is a flowchart of a data recovery method according to an example embodiment of the present disclosure. The data recovery method may be applied to the slave computing node shown in FIG. 1 or the computing node shown in FIG. 2. With reference to FIG. 5, the data recovery method includes the following steps:

S510: When current checkpoint data is successfully stored in a persistent memory, sending a notification message representing that a corresponding computing node successfully stores the current checkpoint data in the persistent memory.

S520: Receive a checkpoint identifier corresponding to a current checkpoint, where the checkpoint identifier is generated when determining that all computing nodes in a distributed graph computing system successfully store the current checkpoint data in respective persistent memories.

S530: Associate the checkpoint identifier with the current checkpoint data stored in the persistent memory, where the associated current checkpoint data is used for data recovery during recovery execution before a checkpoint identifier corresponding to a next checkpoint is obtained.

For detailed descriptions of the foregoing steps S510 to S530, reference may be made to the foregoing embodiment, and details are not described herein again.

In the foregoing manner, the checkpoint identifier corresponding to the current checkpoint is generated only when determining that all the computing nodes in the distributed graph computing system successfully store the current checkpoint data in the respective persistent memories, so that the computing node can further associate the checkpoint identifier with the current checkpoint data stored in the persistent memory, and can use the current checkpoint data for data recovery before the checkpoint identifier corresponding to the next checkpoint is obtained. In this way, during subsequent recovery execution before the checkpoint identifier corresponding to the next checkpoint is obtained, it can be ensured that any computing node can use the current checkpoint data for recovery, to ensure iteration consistency of the checkpoint data, thereby ensuring accuracy of a graph computing result recovered by using a checkpoint.

In some implementations, the method in this embodiment of the present disclosure may further include the following steps:

receiving a recovery message for indicating data recovery, where the recovery message includes the checkpoint identifier; obtaining the associated current checkpoint data from the persistent memory according to the checkpoint identifier; and performing data recovery based on the current checkpoint data.

FIG. 6 is a diagram of interaction of a data recovery method according to an example embodiment of the present disclosure. The data recovery method may be applied to the distributed graph computing system shown in FIG. 1 or the distributed graph computing system shown in FIG. 2. With reference to FIG. 6, the data recovery method includes the following steps:

S610: When successfully storing current checkpoint data in a persistent memory, a slave computing node sends, to a master computing node, a notification message representing that the corresponding computing node successfully stores the current checkpoint data in the persistent memory.

S620: When determining that all computing nodes in a distributed graph computing system successfully store the current checkpoint data in respective persistent memories, the master computing node generates a checkpoint identifier corresponding to a current checkpoint.

S630: The master computing node sends the checkpoint identifier to the slave computing nodes.

S640: The slave computing node associates the checkpoint identifier with the current checkpoint data stored in the persistent memory.

The associated current checkpoint data is used for data recovery during recovery execution before the corresponding slave computing node obtains a checkpoint identifier corresponding to a next checkpoint.

For detailed descriptions of the foregoing steps S610 to S640, reference may be made to the foregoing embodiment, and details are not described herein again.

In the foregoing manner, the checkpoint identifier corresponding to the current checkpoint is generated only when determining that all the computing nodes in the distributed graph computing system successfully store the current checkpoint data in the respective persistent memories, so that the computing node can further associate the checkpoint identifier with the current checkpoint data stored in the persistent memory, and can use the current checkpoint data for data recovery before the checkpoint identifier corresponding to the next checkpoint is obtained. In this way, during subsequent recovery execution before the checkpoint identifier corresponding to the next checkpoint is obtained, it can be ensured that any computing node can use the current checkpoint data for recovery, to ensure iteration consistency of the checkpoint data, thereby ensuring accuracy of a graph computing result recovered by using a checkpoint.

Figures 7, 8:
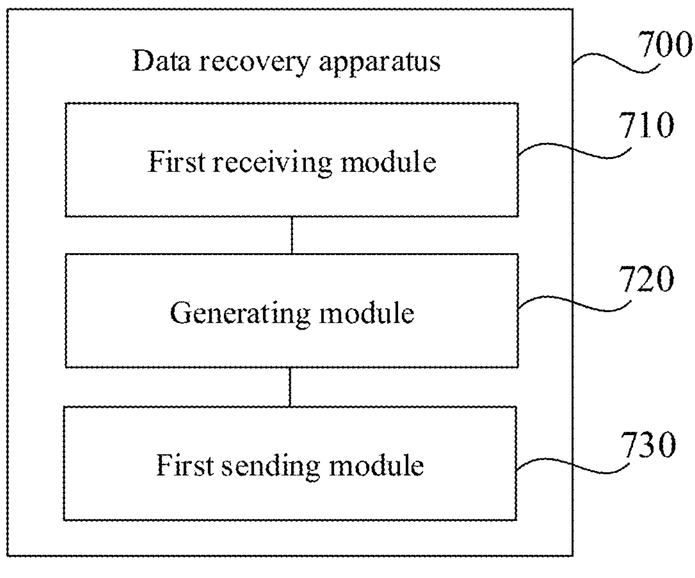
FIG. 7 is a block diagram of a data recovery apparatus according to an example embodiment of the present disclosure.
FIG. 8 is a block diagram of a data recovery apparatus according to an example embodiment of the present disclosure.

FIG. 7 is a block diagram of a data recovery apparatus according to an exemplary embodiment of the present disclosure. Referring to FIG. 7, the data recovery apparatus 700 includes a first receiving module 710, a generating module 720 and a first sending module 730,

- the first receiving module 710 is configured to receive a notification message sent by a computing node in a distributed graph computing system, wherein the notification message represents that the corresponding computing node successfully stores current checkpoint data in a persistent memory;
- the generating module 720 is configured to generate a checkpoint identifier corresponding to a current checkpoint when determining that all computing nodes in the distributed graph computing system successfully store the current checkpoint data in respective persistent memories; and
- the first sending module 730 is configured to send the checkpoint identifier to each computing node, so that the each computing node associates the checkpoint identifier with the current checkpoint data stored in the persistent memory, and associated current checkpoint data is used for data recovery during recovery execution before the corresponding computing node obtains a checkpoint identifier corresponding to a next checkpoint.

Optionally, the data recovery apparatus 700 further includes an updating module and a second sending module,

- the updating module is configured to update, by using the checkpoint identifier, a checkpoint identifier stored in the persistent memory;
- the second sending module is configured to send, to a target computing node that performs data recovery, a recovery message for indicating data recovery when determining that the current checkpoint data is to be recovered, so that the target computing node obtains, from the respective persistent memories according to the checkpoint identifier included in the recovery message, the associated current checkpoint data, and performs data recovery based on the current checkpoint data.

Optionally, the data recovery apparatus 700 further includes a first determining module, a second determining module and a first storage module, The first determining module is configured to determine each key in a key value pair storage structure based on a first data type of each piece of data included in the current checkpoint data and a superstep sequence number corresponding to the current checkpoint data;

The second determining module is configured to determine values in the key value pair storage structure based on data content respectively corresponding to data of first data types included in the current checkpoint data; and The first storage module is configured to use a key and a value that correspond to a same first data type as a set of key value pair data for storage into the persistent memory of the computing node.

Optionally, the data recovery apparatus 700 further includes a second storage module and a third storage module, The second storage module is configured to when the current checkpoint is a checkpoint constructed before a first superstep, use topology information and an initial vertex state that are included in graph data on which graph computing is to be performed as the current checkpoint data for storage into the persistent memory of the computing node; or The third storage module is configured to when the current checkpoint is a checkpoint constructed for a superstep of any checkpoint after the first superstep, use an incremental vertex state corresponding to the superstep of the checkpoint and message data corresponding to the superstep of the checkpoint as the current checkpoint data for storage into the persistent memory of the computing node, wherein the incremental vertex state is a vertex state change of a vertex state corresponding to the superstep of the checkpoint relative to the initial vertex state.

Optionally, a memory of any computing node in the distributed graph computing system includes a first buffer, a second buffer, and a third buffer; when the current checkpoint is a checkpoint constructed for a superstep of any checkpoint after a first superstep, the first buffer is used to store message data corresponding to a superstep between a superstep of the current checkpoint and a superstep of a previous checkpoint, and message data corresponding to the superstep of the current checkpoint is stored in an idle buffer in the second buffer and the third buffer.

Optionally, the data recovery apparatus 700 further includes a first obtaining module, a third determining module and a fourth storage module, The first obtaining module is configured to obtain a second data type of data to be stored into the persistent memory;

The third determining module is configured to determine a target storage mode corresponding to the data based on a correspondence between the second data type and a storage mode; and The fourth storage module is configured to store the data based on the target storage mode.

Optionally, the second data type includes segmentable data and non-segmentable data. In this case, the fourth storage module includes a first storage submodule and a second storage submodule, The first storage submodule is configured to segment the segmentable data according to memory page sizes in the persistent memory, and store segmented data respectively into corresponding memory pages; and The second storage submodule is configured to apply for a memory block corresponding to a size of the non-segmentable data from the persistent memory, and store the non-segmentable data into the memory block.

Optionally, the data recovery apparatus 700 further includes a managing module, The managing module is configured to manage each piece of data stored in the persistent memory according to a lifecycle corresponding to the each piece of data stored in the persistent memory of the computing node.

Optionally, the lifecycle includes persistent storage, deletion after reading, and storage with the checkpoint identifier, in this case, the managing module includes a first managing submodule, a second managing submodule and a third managing submodule, the first managing submodule is configured to, in a process of performing distributed graph computing on graph data, store data whose corresponding lifecycle is persistent storage into the persistent memory of the computing node;

the second managing submodule is configured to, in the process of performing distributed graph computing on the graph data, after reading data that is in the persistent memory and whose corresponding lifecycle is deletion after reading, delete the data whose corresponding lifecycle is deletion after reading; and the third managing submodule is configured to, in the process of performing distributed graph computing on the graph data, after deleting the checkpoint identifier, delete data that is associated with deleted checkpoint identifier and whose corresponding lifecycle is storage with the checkpoint identifier.

FIG. 8 is a block diagram of a data recovery apparatus according to an exemplary embodiment of the present disclosure. Referring to FIG. 8, the data recovery device 800 includes a third sending module 810, a second receiving module 820, an associating module 830, The third sending module 810 is configured to, when current checkpoint data is successfully stored in a persistent memory, send a notification message representing that a corresponding computing node successfully stores the current checkpoint data in the persistent memory;

The second receiving module 820 is configured to, receive a checkpoint identifier corresponding to a current checkpoint, wherein the checkpoint identifier is generated when determining that all computing nodes in a distributed graph computing system successfully store the current checkpoint data in respective persistent memories; and The associating module 830 is configured to associate the checkpoint identifier with the current checkpoint data stored in the persistent memory, wherein associated current checkpoint data is used for data recovery during recovery execution before a checkpoint identifier corresponding to a next checkpoint is obtained.

Optionally, the data recovery apparatus 800 further includes a third receiving module, a second obtaining module and a recovering module, The third receiving module is configured to receive a recovery message for indicating data recovery, wherein the recovery message includes the checkpoint identifier;

The second obtaining module is configured to obtain the associated current checkpoint data from the persistent memory according to the checkpoint identifier; and The recovering module is configured to perform data recovery based on the current checkpoint data.

Figure 9:
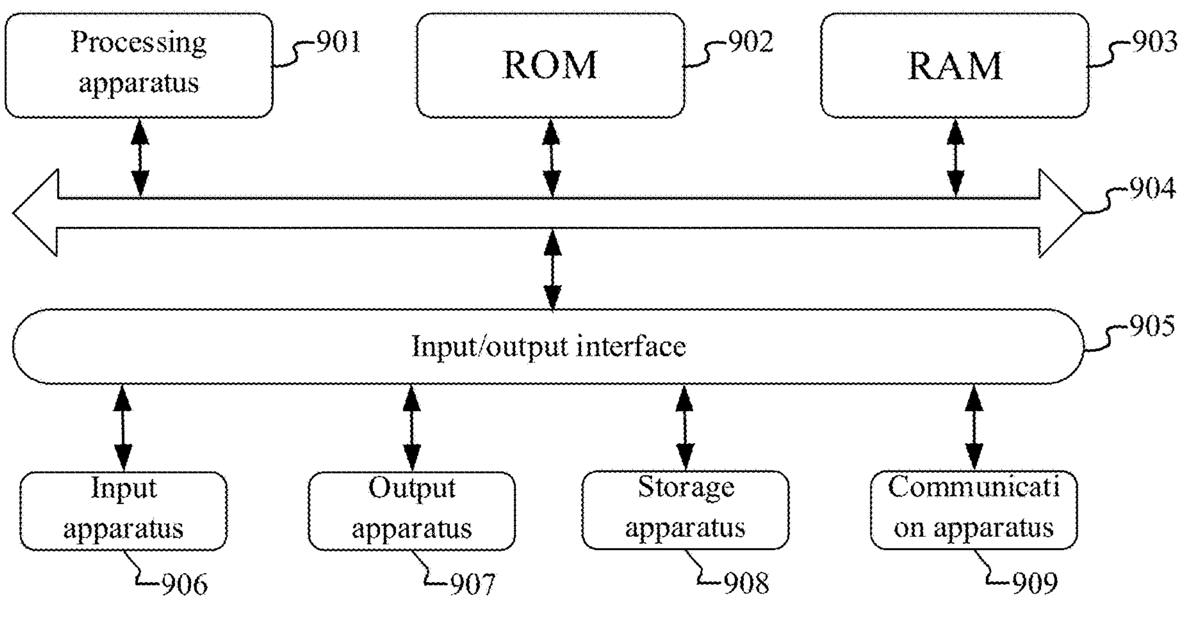
FIG. 9 is a schematic structural diagram of an electronic device according to an example embodiment of the present disclosure.

The following shows, with reference to FIG. 9, a schematic structural diagram of an electronic device 900 adapted to implement embodiments of the present disclosure. The electronic device in this embodiment of the present disclosure may include but is not limited to a computer, a table computer, and a notebook computer. The electronic device shown in FIG. 9 is merely an example, and should not constitute any limitation on functions and use scope of embodiments of the present disclosure.

As shown in FIG. 9, the electronic device 900 may include a processing apparatus (for example, a central processing unit, a graphics processing unit, or the like) 901 that may perform various suitable actions and processing according to a program stored in a read-only memory (ROM) 902 or loaded from a storage apparatus 908 into a random access memory (RAM) 903. The RAM 903 also stores various programs and data necessary for an operation of the electronic device 900. The processing apparatus 901, the ROM 902, and the RAM 903 are connected to each other through a bus 904. An input/output (I/O) interface 905 is also connected to the bus 904.

Usually, the following apparatuses may be connected to the I/O interface 905: an input apparatus 906 including, for example, a touchscreen, a touchpad, a keyboard, a mouse, a camera, a microphone, an accelerometer, a gyroscope, or the like; an output apparatus 907 including, for example, a liquid crystal display (LCD), a speaker, a vibrator, or the like; a storage apparatus 908 including, for example, a magnetic tape, a hard disk, or the like; and a communication apparatus 909. The communication apparatus 909 may allow the electronic device 900 to communicate in a wireless or wired manner with another device to exchange data. Although FIG. 9 shows the electronic device 900 with various apparatuses, it should be understood that it is not required to implement or own all the shown apparatuses. More or fewer apparatuses may alternatively be implemented or owned.

In particular, according to embodiments of the present disclosure, the foregoing process described with reference to a flowchart may be implemented as a computer software program. For example, an embodiment of the present disclosure includes a computer program product, including a computer program carried on a non-transient computer-readable medium, and the computer program includes program code for executing the method shown in a flowchart. In such an embodiment, the computer program may be downloaded and installed from a network through the communication apparatus 909, or installed from the storage apparatus 908, or installed from the ROM 902. When the computer program is executed by the processing apparatus 901, the foregoing functions defined in the method of this embodiment of the present disclosure are executed.

It should be noted that, the computer-readable medium of the present disclosure may be a computer-readable signal medium or a computer-readable storage medium, or a combination thereof. The computer-readable storage medium may be, but is not limited to, an electric, magnetic, optical, electromagnetic, infrared, or semiconductor system, apparatus, or device, or any combination thereof. More specific examples of the computer-readable storage medium may include, but not limited to, an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium including or storing a program that may be used by an instruction execution system, apparatus, or device, or be used in combination with an instruction execution system, apparatus, or device. However, in the present disclosure, a computer-readable signal medium may include a data signal propagated in a baseband or propagated as a part of a carrier, where the data signal carries computer-readable program code. Such a propagated data signal may take a variety of forms, including but not limited to an electromagnetic signal, an optical signal, or any suitable combination thereof. The computer-readable signal medium may alternatively be any computer-readable medium other than the computer-readable storage medium. The computer-readable signal medium may send, propagate, or transmit the program used by the instruction execution system, apparatus, or device, or used in combination with the instruction execution system, apparatus, or device. The program code included in the computer-readable medium may be transmitted through any suitable medium, including but not limited to: a wire, an optical cable, RF (radio frequency), and the like, or any suitable combination thereof.

In some implementations, the electronic device may communicate by using any currently known or future developed network protocol, such as HTTP (HyperText Transfer Protocol), and may be interconnected with digital data communication (for example, a communication network) in any form or medium. Examples of the communication network include a local area network ("LAN"), a wide area network ("WAN"), the Internet (for example, the Internet), and an end-to-end network (for example, an ad hoc end-to-end network), as well as any currently known or future developed network.

The computer-readable medium may be included in the electronic device; or may exist independently without being assembled into the electronic device.

The computer-readable medium carries one or more programs, and when the one or more programs are executed by the electronic device, the electronic device is enabled to: receive a notification message sent by a computing node in a distributed graph computing system, where the notification message represents that the corresponding computing node successfully stores current checkpoint data in a persistent memory; generate a checkpoint identifier corresponding to a current checkpoint when determining that all computing nodes in the distributed graph computing system successfully store the current checkpoint data in respective persistent memories; and send the checkpoint identifier to each computing node, so that each computing node associates the checkpoint identifier with the current checkpoint data stored in the persistent memory, and the associated current checkpoint data is used for data recovery during recovery execution before the corresponding computing node obtains a checkpoint identifier corresponding to a next checkpoint.

Alternatively, the electronic device is enabled to: when current checkpoint data is successfully stored in a persistent memory, send a notification message representing that a corresponding computing node successfully stores the current checkpoint data in the persistent memory; receive a checkpoint identifier corresponding to a current checkpoint, where the checkpoint identifier is determined when determining that all computing nodes in a distributed graph computing system successfully store the current checkpoint data in respective persistent memories; and associate the checkpoint identifier with the current checkpoint data stored in the persistent memory, where the associated current checkpoint data is used for data recovery during recovery execution before a checkpoint identifier corresponding to a next checkpoint is obtained.

Computer program code for performing the operations of the present disclosure may be written in one or more programming languages or a combination thereof. The programming languages include, but are not limited to, object oriented programming languages such as Java, Smalltalk, C++, and conventional procedural programming languages such as "C" language or similar programming languages. The program code may be executed entirely on a user computer, or some may be executed on a user computer as a separate software package, or some may be executed on a user computer while some is executed on a remote computer, or the code may be entirely executed on a remote computer or a server. When a remote computer is involved, the remote computer may be connected to a user computer by using any type of network, including a local area network (LAN) or a wide area network (WAN), or may be connected to an external computer (for example, connected by using an Internet service provider through the Internet).

The flowcharts and block diagrams in the accompanying drawings show system architectures, functions, and operations that may be implemented by systems, methods, and computer program products according to various embodiments of the present disclosure. In this regard, each block in the flowcharts or block diagrams may represent a module, a program segment, or a part of code, and the module, the program segment, or the part of the code includes one or more executable instructions for implementing a specified logical function. It should also be noted that, in some alternative implementations, functions marked in the blocks may also occur in a sequence different from that marked in the accompanying drawings. For example, two consecutively shown blocks may be actually executed substantially in parallel, or sometimes may be executed in a reverse sequence, depending on a function involved. It should also be noted that, each block in a block diagram and/or a flowchart, as well as combinations of blocks in the block diagram and/or the flowchart, may be implemented with a dedicated hardware-based system that performs a specified function or operation, or may be implemented with a combination of dedicated hardware and computer instructions.

The described modules in embodiments of the present disclosure may be implemented by way of software or may be implemented by way of hardware. A name of a module does not constitute a limitation on the module itself in some cases.

The functions described above herein may be performed, at least partially, by one or more hardware logic components. For example, non-limitatively, exemplary types of hardware logic components that may be used include: a field programmable gate array (FPGA), an application-specific integrated circuit (ASIC), application-specific standard product (ASSP), a system on chip (SOC), a complex programmable logical device (CPLD), and the like.

In the context of the present disclosure, a machine-readable medium may be a tangible medium that may include or store a program for use by or in combination with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing content. More specific examples of the machine-readable storage medium include an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing content.

The descriptions are merely descriptions of preferred embodiments of the present disclosure and technical principles used in the present disclosure. A person skilled in the art should understand that the disclosure scope of the present disclosure is not limited to the technical solution formed by a particular combination of the foregoing technical features, but should also cover other technical solutions formed by any combination of the foregoing technical features or their equivalent features without departing from the foregoing disclosure concept, for example, technical solutions formed by interchanging the foregoing features with (but not limited to) technical features having similar functions disclosed in the present disclosure.

In addition, although the operations are described in a particular sequence, this should not be construed as requiring that the operations be executed in the particular sequence shown or in sequential order of execution. Multitasking and parallel processing may be advantageous in a particular environment. Similarly, although several specific implementation details are included in the foregoing discussion, these should not be construed as limiting the scope of the present disclosure. Some features described in the context of separate embodiments may also be implemented in combination in a single embodiment. Conversely, various features described in the context of a single embodiment may also be implemented in a plurality of embodiments, either separately or in any suitable sub-combination.

Although the present subject matter has been described using language specific to structural features and/or logical actions of the method, it should be understood that the subject matter defined in the appended claims is not necessarily limited to the particular features or actions described above. Rather, the particular features and actions described above are merely exemplary forms of implementing the claims. For the apparatus in the foregoing embodiment, specific manners of performing operations by each module are described in detail in embodiments related to the method, and details are not described herein.

What is claimed is:

1. A data recovery method, comprising:

receiving a notification message sent by a computing node in a distributed graph computing system, wherein the notification message represents that the corresponding computing node successfully stores current checkpoint data in a persistent memory;

generating a checkpoint identifier corresponding to a current checkpoint when determining that all computing nodes in the distributed graph computing system successfully store the current checkpoint data in respective persistent memories; and sending the checkpoint identifier to each computing node, so that the each computing node associates the checkpoint identifier with the current checkpoint data stored in the persistent memory, and associated current checkpoint data is used for data recovery during recovery execution before the corresponding computing node obtains a checkpoint identifier corresponding to a next checkpoint, wherein any computing node in the distributed graph computing system manages, by a following manner, data stored in the persistent memory of the computing node:

managing each piece of data stored in the persistent memory according to a lifecycle corresponding to the each piece of data stored in the persistent memory of the computing node.

2. The method according to claim 1, wherein the method further comprises:

updating, by using the checkpoint identifier, a checkpoint identifier stored in the persistent memory;

sending, to a target computing node that performs data recovery, a recovery message for indicating data recovery when determining that the current checkpoint data is to be recovered, so that the target computing node obtains, from the respective persistent memories according to the checkpoint identifier comprised in the recovery message, the associated current checkpoint data, and performs data recovery based on the current checkpoint data.

3. The method according to claim 1, wherein any computing node in the distributed graph computing system stores the current checkpoint data into the persistent memory of the computing node by a following manner:

determining each key in a key value pair storage structure based on a first data type of each piece of data comprised in the current checkpoint data and a superstep sequence number corresponding to the current checkpoint data;

determining values in the key value pair storage structure based on data content respectively corresponding to data of first data types comprised in the current checkpoint data; and using a key and a value that correspond to a same first data type as a set of key value pair data for storage into the persistent memory of the computing node.

4. The method according to claim 1, wherein any computing node in the distributed graph computing system stores the checkpoint data into the persistent memory of the computing node by a following manner:

when the current checkpoint is a checkpoint constructed before a first superstep, using topology information and an initial vertex state that are comprised in graph data on which graph computing is to be performed as the current checkpoint data for storage into the persistent memory of the computing node; or when the current checkpoint is a checkpoint constructed for a superstep of any checkpoint after the first superstep, using an incremental vertex state corresponding to the superstep of the checkpoint and message data corresponding to the superstep of the checkpoint as the current checkpoint data for storage into the persistent memory of the computing node, wherein the incremental vertex state is a vertex state change of a vertex state corresponding to the superstep of the checkpoint relative to the initial vertex state.

5. The method according to claim 1, wherein a memory of any computing node in the distributed graph computing system comprises a first buffer, a second buffer, and a third buffer; when the current checkpoint is a checkpoint constructed for a superstep of any checkpoint after a first superstep, the first buffer is used to store message data corresponding to a superstep between a superstep of the current checkpoint and a superstep of a previous checkpoint, and message data corresponding to the superstep of the current checkpoint is stored in an idle buffer in the second buffer and the third buffer.

6. The method according to claim 1, wherein any computing node in the distributed graph computing system stores data into the persistent memory of the computing node by a following manner:

obtaining a second data type of data to be stored into the persistent memory;

determining a target storage mode corresponding to the data based on a correspondence between the second data type and a storage mode; and storing the data based on the target storage mode.

7. The method according to claim 6, wherein the second data type comprises segmentable data and non-segmentable data, and the storing the data based on the target storage mode comprises:

segmenting the segmentable data according to memory page sizes in the persistent memory, and storing segmented data respectively into corresponding memory pages; and applying for a memory block corresponding to a size of the non-segmentable data from the persistent memory, and storing the non-segmentable data into the memory block.

8. The method according to claim 1, wherein the lifecycle comprises persistent storage, deletion after reading, and storage with the checkpoint identifier, and the managing each piece of data stored in the persistent memory according to a lifecycle corresponding to the each piece of data stored in the persistent memory of the computing node comprises:

in a process of performing distributed graph computing on graph data, storing data whose corresponding lifecycle is persistent storage into the persistent memory of the computing node;

in the process of performing distributed graph computing on the graph data, after reading data that is in the persistent memory and whose corresponding lifecycle is deletion after reading, deleting the data whose corresponding lifecycle is deletion after reading; and in the process of performing distributed graph computing on the graph data, after deleting the checkpoint identifier, deleting data that is associated with deleted checkpoint identifier and whose corresponding lifecycle is storage with the checkpoint identifier.

9. A non-transitory computer-readable medium, storing a computer program, wherein the computer program, when executed by at least one processor, cause the at least one processor to implement operations comprising:

receiving a notification message sent by a computing node in a distributed graph computing system, wherein the notification message represents that the corresponding computing node successfully stores current checkpoint data in a persistent memory;

generating a checkpoint identifier corresponding to a current checkpoint when determining that all computing nodes in the distributed graph computing system successfully store the current checkpoint data in respective persistent memories; and sending the checkpoint identifier to each computing node, so that the each computing node associates the checkpoint identifier with the current checkpoint data stored in the persistent memory, and associated current checkpoint data is used for data recovery during recovery execution before the corresponding computing node obtains a checkpoint identifier corresponding to a next checkpoint, wherein any computing node in the distributed graph computing system manages, by a following manner, data stored in the persistent memory of the computing node:

managing each piece of data stored in the persistent memory according to a lifecycle corresponding to the each piece of data stored in the persistent memory of the computing node.

10. The non-transitory computer-readable medium according to claim 9, wherein the operations further comprise:

updating, by using the checkpoint identifier, a checkpoint identifier stored in the persistent memory;

sending, to a target computing node that performs data recovery, a recovery message for indicating data recovery when determining that the current checkpoint data is to be recovered, so that the target computing node obtains, from the respective persistent memories according to the checkpoint identifier comprised in the recovery message, the associated current checkpoint data, and performs data recovery based on the current checkpoint data.

11. The non-transitory computer-readable medium according to claim 9, wherein any computing node in the distributed graph computing system stores the current checkpoint data into the persistent memory of the computing node by a following manner:

determining each key in a key value pair storage structure based on a first data type of each piece of data comprised in the current checkpoint data and a superstep sequence number corresponding to the current checkpoint data;

determining values in the key value pair storage structure based on data content respectively corresponding to data of first data types comprised in the current checkpoint data; and using a key and a value that correspond to a same first data type as a set of key value pair data for storage into the persistent memory of the computing node.

12. The non-transitory computer-readable medium according to claim 9, wherein any computing node in the distributed graph computing system stores the checkpoint data into the persistent memory of the computing node by a following manner:

when the current checkpoint is a checkpoint constructed before a first superstep, using topology information and an initial vertex state that are comprised in graph data on which graph computing is to be performed as the current checkpoint data for storage into the persistent memory of the computing node; or when the current checkpoint is a checkpoint constructed for a superstep of any checkpoint after the first superstep, using an incremental vertex state corresponding to the superstep of the checkpoint and message data corresponding to the superstep of the checkpoint as the current checkpoint data for storage into the persistent memory of the computing node, wherein the incremental vertex state is a vertex state change of a vertex state corresponding to the superstep of the checkpoint relative to the initial vertex state.

13. An electronic device, comprising:

a storage apparatus, storing a computer program; and a processing apparatus, configured to execute the computer program in the storage apparatus, to implement operations comprising:

receiving a notification message sent by a computing node in a distributed graph computing system, wherein the notification message represents that the corresponding computing node successfully stores current checkpoint data in a persistent memory;

generating a checkpoint identifier corresponding to a current checkpoint when determining that all computing nodes in the distributed graph computing system successfully store the current checkpoint data in respective persistent memories; and sending the checkpoint identifier to each computing node, so that the each computing node associates the checkpoint identifier with the current checkpoint data stored in the persistent memory, and associated current checkpoint data is used for data recovery during recovery execution before the corresponding computing node obtains a checkpoint identifier corresponding to a next checkpoint, wherein any computing node in the distributed graph computing system manages, by a following manner, data stored in the persistent memory of the computing node:

managing each piece of data stored in the persistent memory according to a lifecycle corresponding to the each piece of data stored in the persistent memory of the computing node.

14. The electronic device according to claim 13, wherein the operations further comprise:

updating, by using the checkpoint identifier, a checkpoint identifier stored in the persistent memory;

sending, to a target computing node that performs data recovery, a recovery message for indicating data recovery when determining that the current checkpoint data is to be recovered, so that the target computing node obtains, from the respective persistent memories according to the checkpoint identifier comprised in the recovery message, the associated current checkpoint data, and performs data recovery based on the current checkpoint data.

15. The electronic device according to claim 13, wherein any computing node in the distributed graph computing system stores the current checkpoint data into the persistent memory of the computing node by a following manner:

determining each key in a key value pair storage structure based on a first data type of each piece of data comprised in the current checkpoint data and a superstep sequence number corresponding to the current checkpoint data;

determining values in the key value pair storage structure based on data content respectively corresponding to data of first data types comprised in the current checkpoint data; and using a key and a value that correspond to a same first data type as a set of key value pair data for storage into the persistent memory of the computing node.

16. The electronic device according to claim 13, wherein any computing node in the distributed graph computing system stores the checkpoint data into the persistent memory of the computing node by a following manner:

when the current checkpoint is a checkpoint constructed before a first superstep, using topology information and an initial vertex state that are comprised in graph data on which graph computing is to be performed as the current checkpoint data for storage into the persistent memory of the computing node; or when the current checkpoint is a checkpoint constructed for a superstep of any checkpoint after the first superstep, using an incremental vertex state corresponding to the superstep of the checkpoint and message data corresponding to the superstep of the checkpoint as the current checkpoint data for storage into the persistent memory of the computing node, wherein the incremental vertex state is a vertex state change of a vertex state corresponding to the superstep of the checkpoint relative to the initial vertex state.

17. The electronic device according to claim 13, wherein a memory of any computing node in the distributed graph computing system comprises a first buffer, a second buffer, and a third buffer; when the current checkpoint is a checkpoint constructed for a superstep of any checkpoint after a first superstep, the first buffer is used to store message data corresponding to a superstep between a superstep of the current checkpoint and a superstep of a previous checkpoint, and message data corresponding to the superstep of the current checkpoint is stored in an idle buffer in the second buffer and the third buffer.

18. The electronic device according to claim 13, wherein any computing node in the distributed graph computing system stores data into the persistent memory of the computing node by a following manner:

obtaining a second data type of data to be stored into the persistent memory;

determining a target storage mode corresponding to the data based on a correspondence between the second data type and a storage mode; and storing the data based on the target storage mode.

19. The electronic device according to claim 18, wherein the second data type comprises segmentable data and non-segmentable data, and the storing the data based on the target storage mode comprises: segmenting the segmentable data according to memory page sizes in the persistent memory, and storing segmented data respectively into corresponding memory pages; and applying for a memory block corresponding to a size of the non-segmentable data from the persistent memory, and storing the non-segmentable data into the memory block.

20. The electronic device according to claim 13, wherein the lifecycle comprises persistent storage, deletion after reading, and storage with the checkpoint identifier, and the managing each piece of data stored in the persistent memory according to a lifecycle corresponding to the each piece of data stored in the persistent memory of the computing node comprises:

in a process of performing distributed graph computing on graph data, storing data whose corresponding lifecycle is persistent storage into the persistent memory of the computing node;

in the process of performing distributed graph computing on the graph data, after reading data that is in the persistent memory and whose corresponding lifecycle is deletion after reading, deleting the data whose corresponding lifecycle is deletion after reading; and in the process of performing distributed graph computing on the graph data, after deleting the checkpoint identifier, deleting data that is associated with deleted checkpoint identifier and whose corresponding lifecycle is storage with the checkpoint identifier.

* * * * *